Inventor:
PIERRE F. DANEL

Dec. 12, 1950 P. F. DANEL 2,533,720
BRANCH PIPE BREECHING FOR PRESSURE CONDUITS
Filed April 20, 1948 2 Sheets-Sheet 2

Inventor:
PIERRE F. DANEL
BY George H. Corey
Attorneys

Patented Dec. 12, 1950

2,533,720

UNITED STATES PATENT OFFICE 2,533,720

BRANCH PIPE BREECHING FOR PRESSURE CONDUITS

Pierre F. Danel, Grenoble, France, assignor to Ateliers Neyret-Beylier & Piccard-Pictet, Grenoble, France, a corporation of France Application April 20, 1948, Serial No. 22,093
In France April 30, 1947

5 Claims. (Cl. 285—210)

The present invention relates to branch pipe connections or breechings for conduits, and more particularly to structures that are adapted for use in pipes or pressure conduits of large dimensions such as mains and penstocks for transporting and distributing water for use in irrigation or power development or for use by municipalities for drinking purposes.

The breechings that have been provided heretofore for such purposes have ordinarily involved the use of unsymmetrical branch pipes that have often badly resolved the hydraulic problems and at the same time have required a heavy structure with external reinforcements to withstand the stresses imposed. Where in the prior constructions the breeching has included a converging conical section with the branch take-off introduced either in advance of or at the converging portion, there has been insufficient natural tendency for the flow to divide and use the branch pipe to capacity and without undue loss of head. Even though various steps have been taken to improve the contour of the walls at the point of intersection and particularly the contour of the dividing ridge at the downstream side of the branch pipe off-take, the problem has remained. Furthermore, there has always been a tendency for the water in passing into the branch pipe to separate from the walls in localized areas with the result that the flow is hindered and an undesirable pressure drop occurs in the branch off-take.

It has sometimes been sought to improve the hydraulic functioning by enlarging the section offered to the branch pipe at the point of junction with the main part of the breeching and then causing the branch pipe to converge to the section required to carry the divided flow. Unfortunately, this requires an increase in the general dimensions of the breeching if an undue loss of head is to be avoided.

Moreover, in all of the prior constructions it has been difficult to provide the breeching with sufficient mechanical resistance. In order to insure the desired rigidity it has been customary to use heavy exterior ribs girdling the breeching adjacent the junction of the branch pipe with the main part of the breeching, and in some instances internal stays have been provided in the region adjacent the junction of the walls of the branch off-take and the breeching on the downstream side of the off-take. This last expedient gives rise to the inconvenience that a wake is created in the current.

The present invention has for an aim to avoid the above enumerated inconveniences of the prior structures and to obtain a structure with good hydraulic characteristics coupled with satisfactory mechanical resistance, and one that involves a substantial reduction in the extent of the reinforcement required to withstand a given flow and pressure.

According to the invention, the axis of the main conduit at the downstream side of the branch pipe off-take, instead of being aligned with the axis of the conduit at the upstream side of the off-take, is offset towards the side opposite to that from which the branch pipe extends. The breeching consists essentially of a single piece construction joined to the upstream and downstream sections of the main conduit by connecting flanges conforming to the shapes of these conduits. Although the arrangement is more frequently applied to circular conduits, it may, of course, be similarly applied to conduits of non-circular section, including square conduits.

The offset disposition of the connection to the downstream section of the main conduit with respect to the connection to the upstream section makes it possible to dispose the dividing ridge joining the branch pipe off-take and the connection to the downstream section of the main conduit in the full current coming from the upstream. This insures a more positive and definitely controlled division of the flow. The dividing ridge is given a suitably rounded profile which facilitates the separation of the current into the two desired flows without setting up undesired eddy currents or localized zones in which the water falls away from the surfaces of the breeching. Besides bringing about good hydraulic functioning and suppression of tendency to separation or falling away from the side walls, the invention insures a notable reduction in the loss of head.

Besides, the invention allows the dimensions of the structure to be substantially reduced and to bring the connecting flanges nearer to the points subject to the greatest stresses, thus bringing a contribution to the reinforcement of the structure. Moreover, it is possible to use particular profiles which by their mere shape offer a better resistance to the stresses due to the internal pressure.

In order better to understand the invention, reference will now be made to the attached drawing wherein are set forth by way of example a presently preferred embodiment of the invention along with several modifications, and for purposes of comparison representative examples of the previously known constructions are also indicated.

Figures 1, 2:
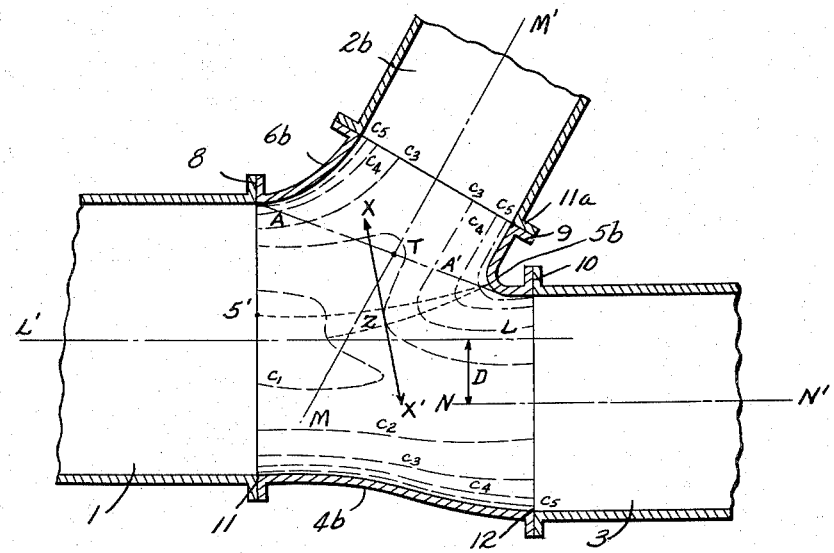
Fig. 1 is a longitudinal section view and Fig. 2 is a top plan view of the presently preferred form of the invention as embodied in a breeching and branch pipe connection of normal form.

In the improved construction of the present invention as typified by the embodiment shown in Fig. 1, a main conduit 1 is connected to a downstream main conduit 3 and a branch pipe offtake 2b by a branch pipe breeching 4b. The connection to the downstream continuation 3 of the main conduit is offset laterally on the opposite side of the breeching 4b from the branch pipe off-take. As shown, the breeching 4b is provided with connecting flanges 8, 9 and 10 connected, respectively, with corresponding flanges 11, 11a and 12 carried by the ends of the conduits 1, 2b and 3. The axis M—M' of the branch pipe off-take 2b lies in the same plane with the axis L—L' of the main pipe 1. The axis N—N' of the downstream continuation 3 of the main conduit is parallel to L—L' but is offset with respect thereto by a distance D.

The opening made in the side of the breeching to form the branch pipe connection is indicated by the line A—A'. It will be seen that this line is inclined to the axis of the main pipe 1.

The surfaces of the branch off-take portion of the breeching adjacent the line of joinder of the branch off-take and the main portion of the breeching include a rounded ridge 5b which extends almost up to the flange 8. Due to the offsetting of the axes L—L' and N—N' this ridge is disposed in the full current, and serves to divide the flow along a line of separation indicated generally by the line 5'—5b in Figure 1. Lines C1, C2, C3, C4 and C5, which are the intersection lines of the structure by horizontal planes, give a general idea of the structure's shape.

Under the above conditions and assuming that the axis of the connection to the downstream continuation 3 of the main pipe is suitably offset with respect to the axis of the main pipe and that the sections of the pipe 2b and 3 are properly proportioned to effect the desired division of the flow, it will be found that the line of arrest or stop line will be located on the surface of the dividing ridge 5b. This will remain true even when the liquid is being supplied at pressures which cause the ratio for the branch flows to be different from the optimum ratio to which the breeching is designed. A zone of dynamic suppression is created on the line 5'—5b and in its general vicinity and this serves to promote the branching of the current. Because of this effect it is possible to increase the interior radius of the portion 6b of the branch pipe off-take connection, thus limiting the risk of separation of the liquid from the walls of the off-take connection adjacent and immediately downstream from the dividing ridge 5b and the wall portion 6b, particularly the latter. For all of the above reasons the hydraulic functioning of the breeching of the present invention is much better than is obtained with the prior constructions. The losses of head are notably reduced.

As seen from the outside of the breeching, the rounded ridge corresponds to a shallow trough or valley Z which extends from 5b almost up to the flange 8. The shallow trough Z increases the resistance of the branch pipe off-take 2b and the continuation 3 to bend about an axis such as X—X' lying in a plane extending generally at right angles to the longitudinal axis of the breeching. In addition, since the valley takes the general form of an arched groin, it promotes a good transmission of the forces exerted between the flange 8 and the portions of the breeching surrounding it, and this makes it possible to reduce the size of the external reinforcing rib or even to dispense with it altogether.

It will be seen that in spite of the reduction in the overall dimensions of the breeching, the interior radius of the elbow formed by the branch pipe with the main pipe is large enough to insure that the branch pipe opening offers to the branched discharge a considerable surface of projection perpendicularly to the upstream conduit. The section of this opening is itself important, not so much because of the length of the line A—A', but because of the length of the axis perpendicular to AA' (indicated by T on the plane of Figure 1). This axis is brought closer to that of the upstream conduit, and consequently into a region where the chord cut by the axis T is greater than in the neighborhood of the periphery. The axis represented by T is, therefore, longer than the axis A—A' which gives to the entrance of the branch pipe a flattened or oval shape. This section of the opening of the branch pipe is favorable from the point of view of resistance because under the effect of the pressure the oval tends to shorten its long axis, thereby opposing lateral spreading of the sides of the opening precisely at the point where there is the greatest tendency for spreading to occur.

It will also be observed that in the structure of Fig. 1 the breeching establishes the connection between the upstream conduit 1 and the downstream conduit 3 by means of a crooked convergence of which the apparent contour conforms generally to the lines 11—12 and A—A'. It might at first glance be assumed that an important diverging zone exists between 11 and 12. In reality, as will be seen by making sections perpendicular to the axis, this diverging zone is very reduced. Moreover, the pressures set up at 5b are transmitted to this diverging zone and thus the risk of separations or falling away of the water from the surfaces of the walls adjacent the bend between 11 and 12 is avoided.

In the case where the stiffening effect of the valley Z and the corresponding inwardly extending ridge is not sufficient, for example, in the case of very high pressures, one may, according to the invention, provide an auxiliary rib 13 as shown on Fig. 2. This rib can extend to and join the flange 8 as shown but in most cases it may terminate short of the flange 8 without inconvenience. In all cases this rib may be much lighter than the ribs required with the previously known forms of breechings.

The present invention is not limited to the case where the upstream conduit 1 and the downstream conduit 3 have their axes L—L' and N—N' respectively parallel. It may likewise be applied in the case where these axes are angularly related to one another. Within this category the relation of the axes of the upstream and downstream conduits to one another and to the axis of the branch pipe may take several forms, viz.:

(a) The three axes may lie in the same plane.

(b) The axes of the upstream conduit and the branch pipe may lie in the same plane and the axis of the downstream conduit may meet this plane at an angle.

(c) None of the three axes intersects either of the other two so that no two of them lie in the same plane.

The first of the three cases mentioned above is represented by Fig. 3, wherein the conventional arrangement of the prior art is shown in broken line with a structure embodying the present invention superimposed thereon in full lines. The axis of the branch pipe off-take 2c is indicated at J—J', the axis of the upstream conduit 1 is represented by the line L—L' and the axis of the downstream conduit 3, in the position taken in the conventional prior art construction, is represented by the line M—M'.

As shown, the axis M—M' of the downstream conduit meets the axis L—L' at the point D and the axis J—J' at the point E. In this case, according to the invention, the offsetting of the axis N—N', which intersects the axis L—L' at C and the axis J—J' at F, is determined with reference to M—M', for example, according to the lengths of the segments EF or CD. In this particular case the invention has the advantage of permitting a construction that is much more compact along with a better hydraulic result.

Figure 4:
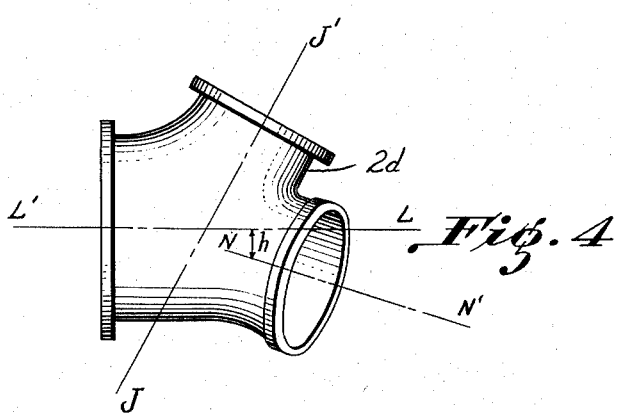

Fig. 4 is a perspective view representing the second of the three modified forms above mentioned wherein the axis N—N' forms an angle with the plane common to the axes L—L' and J—J' of the upstream conduit 1 (not shown) and the branch pipe off-take connection 2d, respectively. In this figure the axis N—N' does not intersect either of the axes L—L' or J—J'. The offsetting of the axes N—N' and L—L' may then be determined by the length of their common perpendicular h.

Figure 3:
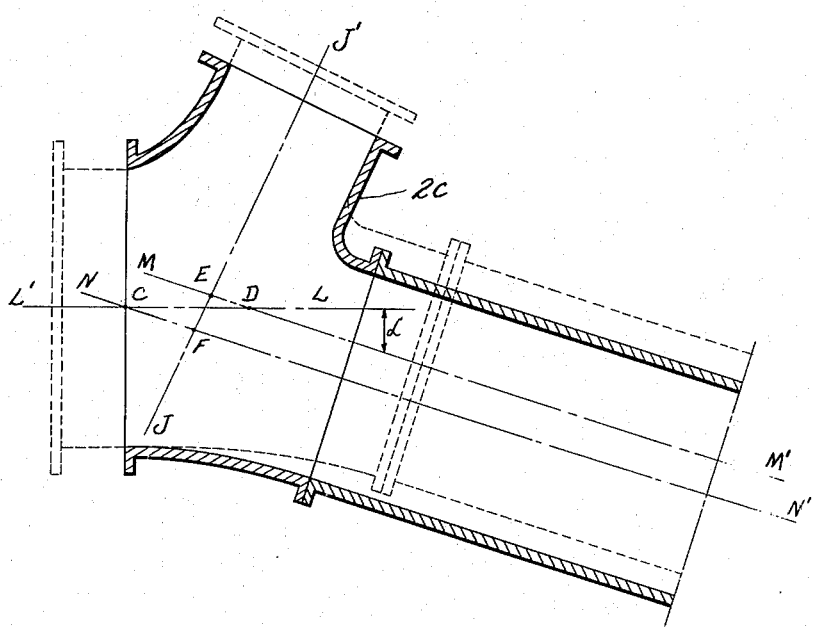
Fig. 3 is a longitudinal section view and Fig. 4 is a perspective view of two modified forms wherein the breeching is design to be used in connection with an upstream conduit and a downstream conduit that are angularly related to one another.

In another modification which may involve a combination of Figs. 3 and 4, the axis N—N' may be disposed in a plane inclined to the horizontal, in which case the common perpendicular will no longer be vertical.

According to still another variation, the axis J—J' of the branch pipe off-take may also make an angle with a plane common to the axes L—L' and N—N'. Finally, the construction may be one wherein the three axes do not meet and consequently no two of them will lie in a single plane.

As previously indicated, the invention is even applicable to breechings for use with non-circular conduits or breechings in which the connections 1, 2 or 3 are non-circular and may even be square. In this latter case, when the walls of the breeching are given shapes similar to those shown in Figs. 1 and 2, the full lines will represent the projections of the vertical walls in place of the apparent contours of the curved surfaces. Therefore, an offsetting of the axes L—L' and N—N' is obtained and the positioning of the dividing ridge 5b in the full current passing towards the downstream branches is assured. The hydraulic advantages remain substantially the same as in the modifications previously described.

The invention is not to be deemed as limited to the precise modifications illustrated but, on the contrary, includes all changes in the form and arrangement of the parts not excluded by the language of the appended claims.

I claim:

1. A breeching for establishing a branch pipe connection to a main pressure conduit which comprises an open-ended tubular member having a branch off-take connection in a side wall thereof and openings at its opposite ends larger than said connection and adapted to be brought into registering relation, respectively, with the upstream section of said main conduit and with the downstream continuation thereof, said opening at the downstream end of said breeching being offset laterally with respect to the opening at the upstream end toward the side of said breeching opposite said branch off-take connection.

2. A breeching according to claim 1 wherein the side wall of the breeching opposite said branch off-take is curved outwardly from the upstream toward the downstream end of said breeching, thereby increasing the extent of the offset of the opening at the downstream end with respect to the opening at the upstream end of said breeching.

3. A breeching according to claim 2 wherein the downstream opening is so offset with respect to the upstream opening and the cross-section areas of the branch off-take and the downstream opening are so proportioned as to insure that the off-take opening is of oval shape in the plane of its intersection with the walls of the breeching and the long axis of the oval extends substantially at right angles to the plane common to the axes of the branch off-take and the downstream continuation of the main conduit.

4. A breeching according to claim 1 wherein each of the longitudinal axes of the openings to the downstream conduit, the downstream continuation thereof and the off-take is so related to the other two axes that no two of the axes lie in the same plane.

5. A breeching for connecting a branch conduit to a larger main conduit, comprising a tubular member having an off-take connection at one side thereof adapted to register with said branch conduit, said tubular member also having openings at its opposite ends adapted to register respectively with the upstream and downstream sections of said main conduit, the opening at the downstream end of said member being offset laterally with respect to the opening at the upstream end toward the side of the breeching opposite the off-take connection, said downstream opening and said off-take connection being connected by a ridge extending across the path of flow from the upstream section of the main conduit, said ridge being so located with respect to the path of flow that it divides the flow substantially in proportion to the capacities of the off-take connection and the downstream opening.

PIERRE F. DANEL.

REFERENCES CITED

The following references are of record in the file of this patent:

FOREIGN PATENTS

| Number | Country | Date |
|---|---|---|
| 670,287 | Germany | July 12, 1930 |
| 122,136 | Switzerland | Nov. 1926 |